May 31, 1966 N. A. CROSS 3,253,479
MECHANICAL RESOLUTION DEVICE
Filed Aug. 19, 1960 5 Sheets-Sheet 1
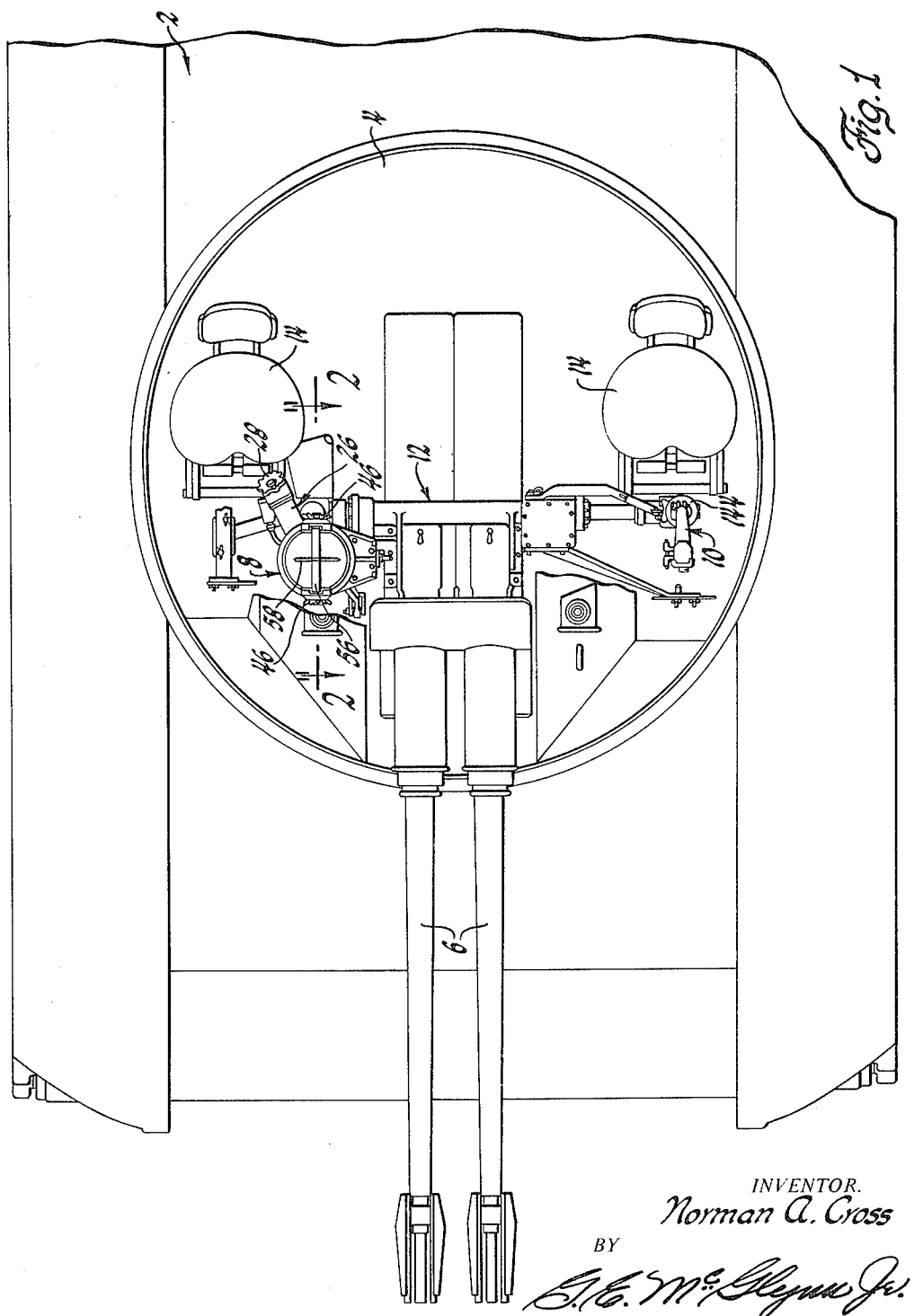
INVENTOR.
Norman A. Cross
BY
ATTORNEY

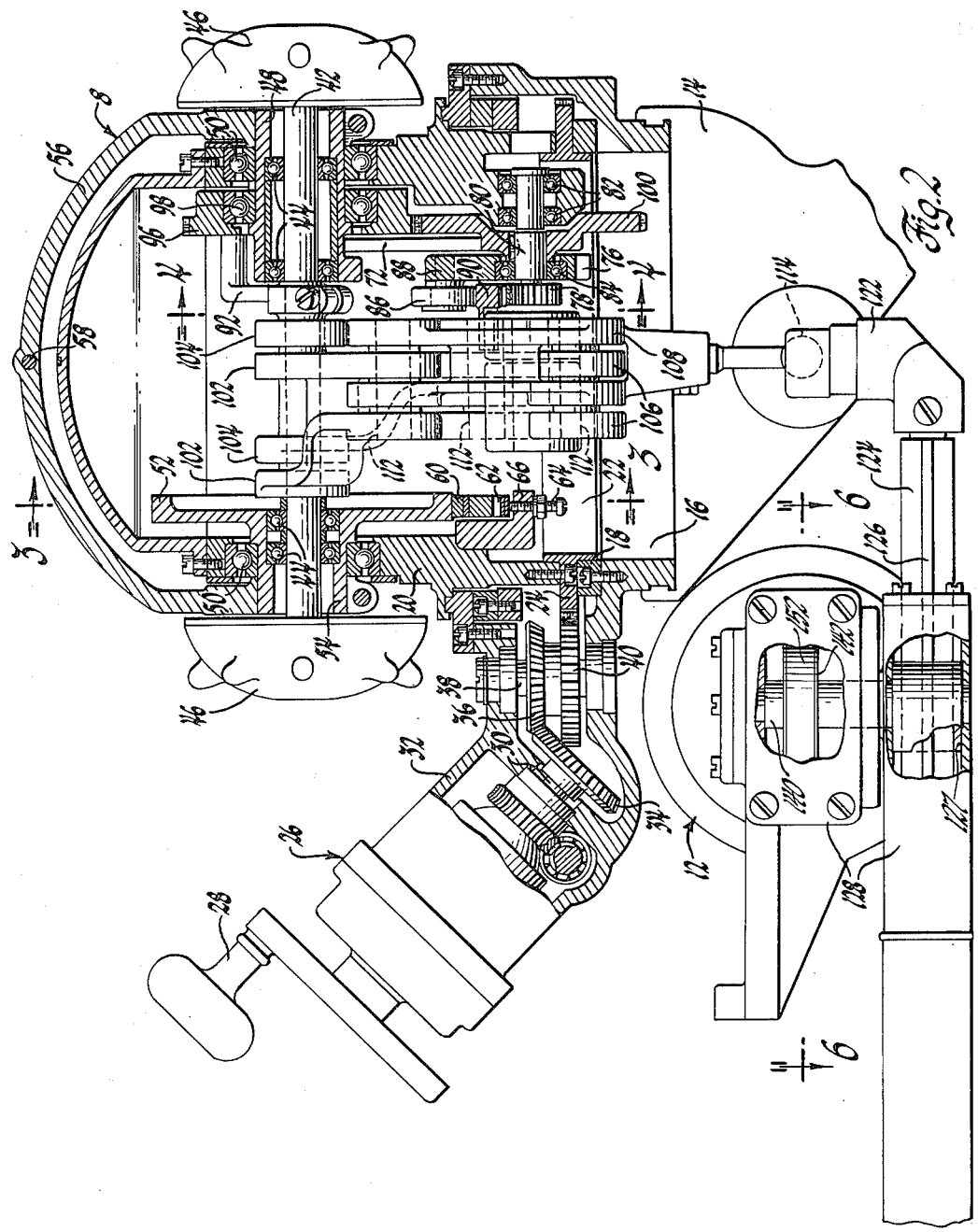

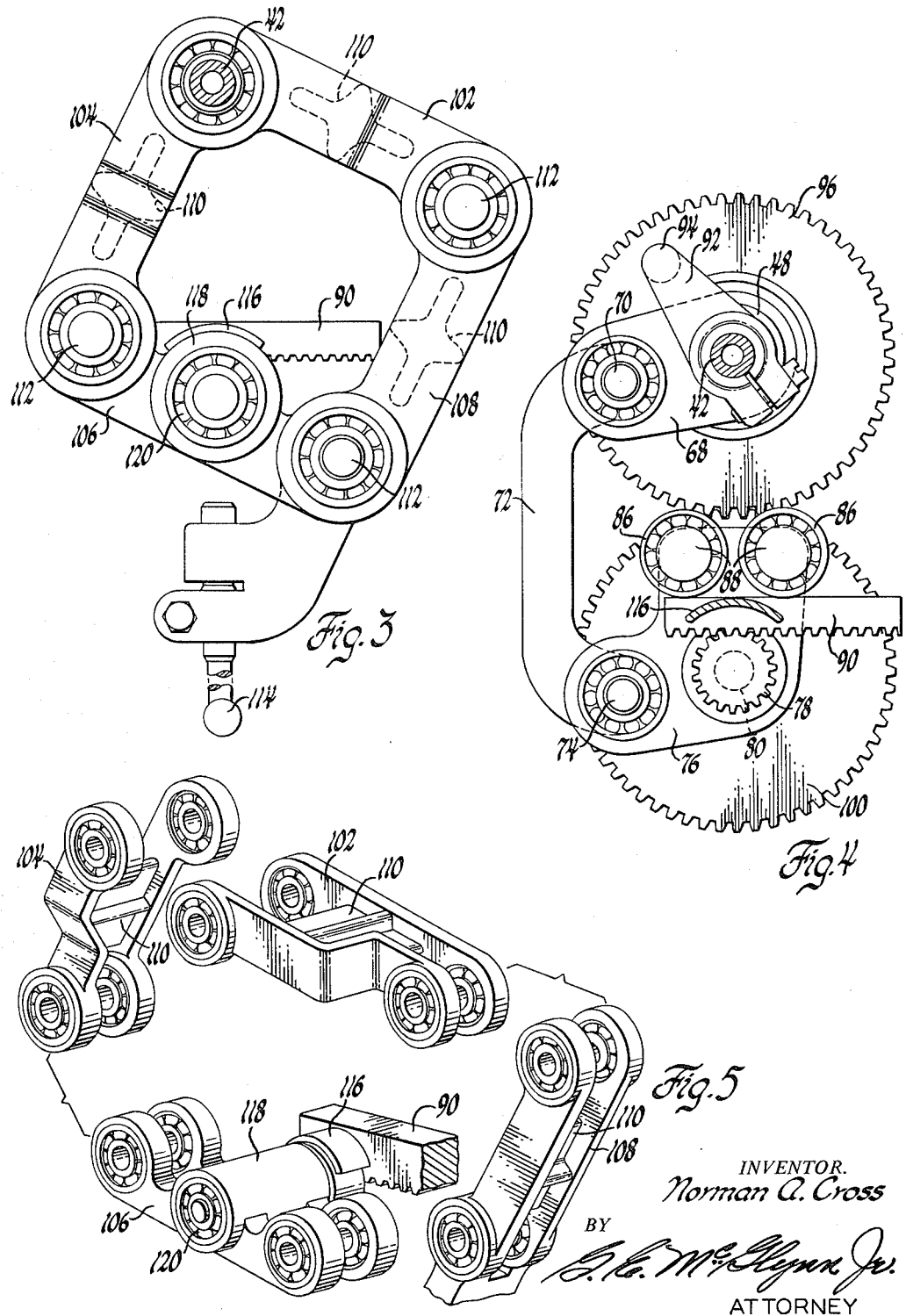

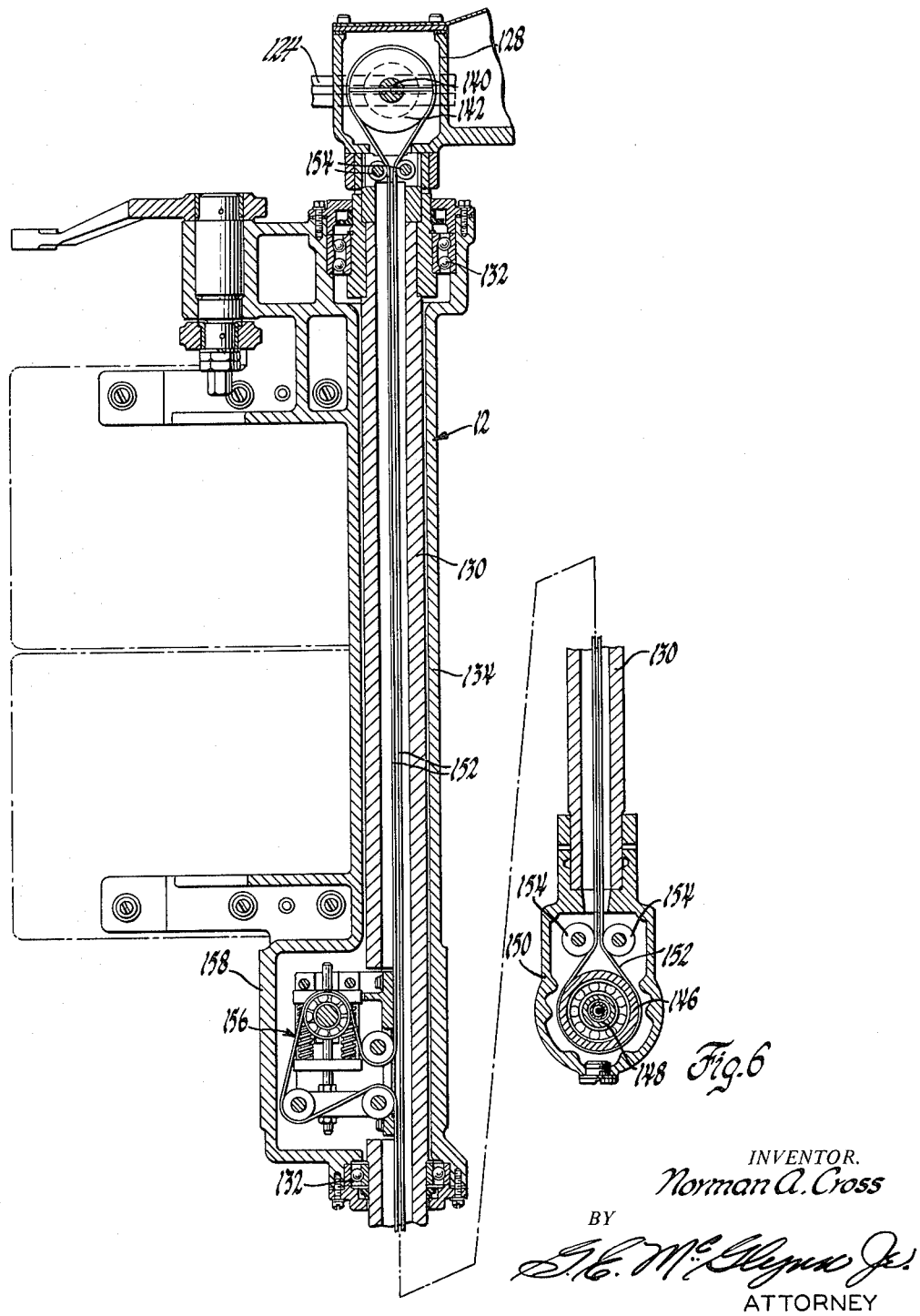

May 31, 1966 N. A. CROSS 3,253,479
MECHANICAL RESOLUTION DEVICE
Filed Aug. 19, 1960 5 Sheets-Sheet 5

INVENTOR.
Norman A. Cross
BY
ATTORNEY

United States Patent Office 3,253,479
Patented May 31, 1966

3,253,479
MECHANICAL RESOLUTION DEVICE
Norman A. Cross, Cleveland, Ohio, assignor to General Motors Corporation, Detroit, Mich., a corporation of Delaware
Filed Aug. 19, 1960, Ser. No. 50,661
10 Claims. (Cl. 74—479)

This invention pertains to a mechanical device for accepting a plurality of input parameters or variables and resolving such parameters into a single output signal and, more particularly, to such a resolution device adapted to be coupled to a reflex sight system associated with a field artillery piece or gun mounted upon a self-propelled vehicle to accept and resolve three input parameters associated with the movement of a flying target to compute the appropriate lead angle to be interposed between the line of sight to the target and the line of gun fire or the path of the projectile propelled from the gun.

For the purpose of illustrating a preferred embodiment thereof, the mechanical resolution device or computer of this invention is shown in the drawings and will be described in connection with a heavy weapons system mounted upon a self-propelled vehicle such as an armored tank. However, as the description of the invention proceeds, it will become readily apparent that the resolution device or computer of this invention may be employed with stationary weapons systems such as heavy field artillery pieces, and in various and sundry other environments in which it is desired to resolve mechanically a plurality of input parameters into a single output signal.

Referring now specifically to the application of a resolution device or computer of the type to which this invention relates to reflex sight systems associated with heavy weapons, prior art devices of this type have typically comprised three slides movably mounted within a housing mounted adjacent the associated weapons system. Each of the slides has been suspended within the housing in such a way as to always maintain one slide vertical and one slide horizontal, while the third slide has been capable of both horizontal and vertical movement depending upon the attitude of the target being sighted upon. One of these slides mounts an output member operatively connected to the reflex sight system in a manner well known in the art, while all three slides are suitably operatively interconnected so as to accept three input parameters assocated with a target, such as a flying aircraft, and resolve such data into a single output signal which is transferred to the reflex sight system to compute the proper lead angle.

Such prior art devices of this type have certain rather serious disadvantages, including those noted briefly hereinafter. One such disadvantage is that the suspension of the three slides is such as to result in a certain unbalance of these members which requires relatively large input power to adjust the slides, and maximizes dynamic effects on the resolution device due to firing of the gun or weapon system. Moreover, relatively large externally added frictions in the form of a brake or brakes are required to retain settings of the slides because of the unbalance aforementioned. Also, the particular suspension of the slides is such as to provide far less than the desired rigidity and stabilization of the system, thereby causing errors in resolution or computation.

In comparison, the present invention eliminates the plurality of slides as used in the prior art devices and, instead, employs pivotally mounted linkage systems suspended from a common support shaft within the computer housing so as to substantially counterbalance the computer system. Moreover, the various linkages of the computer system employ preloaded antifriction bearings which exert a minimum of friction throughout the computer drive, and minimize resolution errors by eliminating backlash at the pivotal joints of the linkage. Because of the counterbalanced mounting of the various linkages on the common support shaft as aforedescribed, input power requirements to the computer and dynamic effects resulting from the firing of the gun or weapon system are minimized, and a minimum of externally added frictions in the form of a brake to retain settings is required. Furthermore, this suspension arrangement provides improved rigidity, stabilizes the computer system and reduces resolution errors.

Therefore, it is a principal object and feature of this invention to provide an improved mechanical resolution device or computer for accepting and resolving a plurality of input parameters into a single output signal.

It is yet another object and feature of this invention to provide an improved device of the type aforedescribed which is adapted to be coupled into a reflex sight system of a heavy weapon to accept up to three input parameters or variables associated with the movement of a target such as a flying aircraft, and to resolve such parameters into a single output signal to the reflex sight system to cause the appropriate lead angle to be interposed between the line of sight to the target and the line of fire of the gun.

It is yet another object and feature of this invention to provide such a resolution device or computer of the type aforedescribed which is characterized by a plurality of linkages pivotally suspended from a common support shaft so as to tend to counterbalance the entire resolution or computer system to provide improved rigidity and stabilization of the system, and a reduction in resolution or computed errors.

These and other objects of the invention, and the manner in which they are attained, will become more apparent hereinafter as the description of the invention proceeds, and in which reference is made to the following drawings in which:

FIGURE 1 is a fragmentary top plan view of a self-propelled vehicle equipped with a weapon system and a preferred embodiment of the invention;

FIGURE 2 is an enlarged view taken on line 2—2 of FIGURE 1, and illustrates a preferred embodiment of the resolution device or computer of this invention;

FIGURE 3 is a view taken on line 3—3 of FIGURE 2;

FIGURE 4 is a view taken on line 4—4 of FIGURE 2;

FIGURE 5 is an exploded perspective view of the linkage of FIGURE 3;

FIGURE 6 is a view taken on line 6—6 of FIGURE 2;

Figure 7:
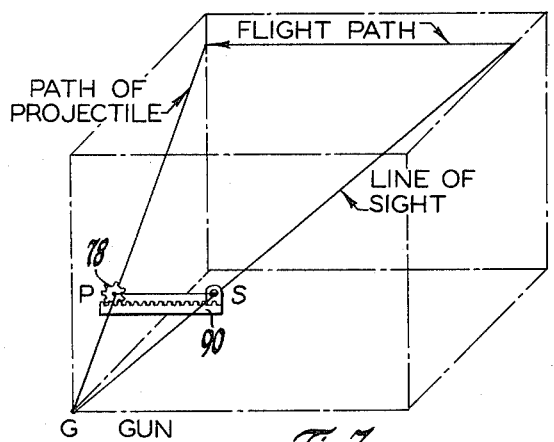
Figure 8:
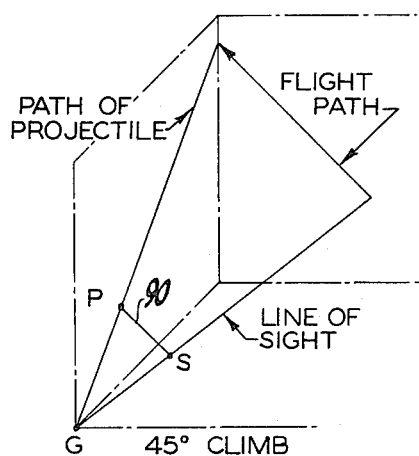
Figure 9:
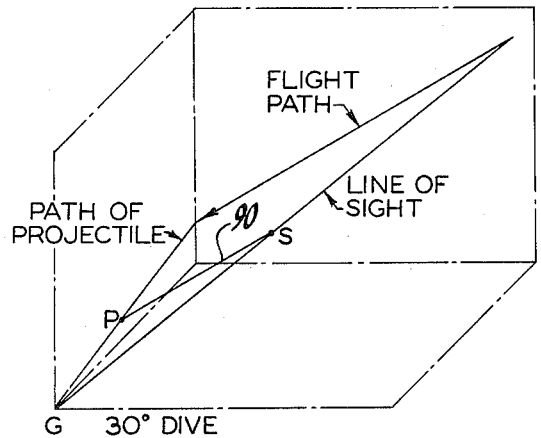
Figure 10:
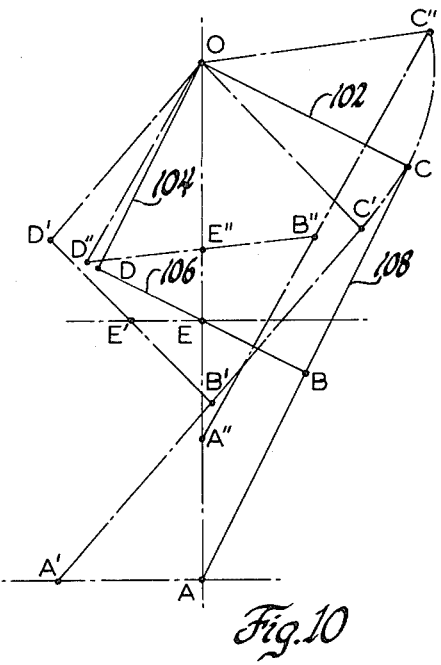

FIGURES 7, 8 and 9 are diagrammatic illustrations of the structure and function of the mechanical resolution device or computer of this invention in computing the appropriate lead angle to be injected between the line of sight to a flying target and the line of fire of the gun, with each figure illustrating a flying target having a different flight path; and FIGURE 10 is a diagrammatic illustration of the structure and function of the linkage of FIGURES 3 and 5.

As aforementioned, the present invention is particularly designed for use in conjunction with a reflex sight system in order to accept up to three input parameters or variables associated with the movement of a target such as a flying aircraft, and to resolve such parameters into a single output signal for use by the reflex sight system. The input information or parameters consist of the direction or azimuth of the flight path of the target, the attitude of the flight path of the target and the speed or velocity of the target along such flight path. The direction or azimuth of the flight path is the particular direction of the flying target in a horizontal plane or a plane parallel to the terrain on which the weapon is mounted, and relative to the axis of the gun. Stated another way, the direction of the flight path is the horizontal angle between a vertical plane containing the flight path and a vertical plane through the axis of the gun, and either toward, away from or parallel to the plane of the gun or any direction inbetween. The attitude or elevational component of the flight path is the angle in a vertical plane between the path of the target and any given horizontal plane or the ground on which the gun is mounted. Thus, the attitude of the flight path may be horizontal or parallel to the ground, at some climb angle or at some dive angle relative to the ground. The third parameter, speed or velocity of the target along its flight path, will be self-explanatory.

By way of further illustration of such parameters, reference may be made to FIGURES 7, 8 and 9. In each of these figures, the flight path varies due to differences in the attitude parameter of each of the flight paths illustrated. In other words, the direction of each of the flight paths illustrated is identical in that the vertical plane containing each of the flight paths is in a plane perpendicular to the vertical plane through the axis of the gun G or the path of the projectile propelled by the gun. On the other hand, the attitude parameter of the flight path shown in FIGURE 7 is horizontal or parallel to the ground line, the attitude parameter of the flight path illustrated in FIGURE 8 is at a 45° climb angle with respect to the ground line or plane, and the attitude parameter of the flight path of FIGURE 9 is at a 30° dive angle with respect to the ground line or plane. The speed or velocity parameter of the target is, of course, its actual or estimated speed along the flight paths illustrated in each of the figures aforementioned.

Referring now to FIGURE 1 of the drawings, a self-propelled gun mount or armored vehicle 2 is illustrated as rotatably mounting in the usual fashion a turret 4 on which there is adjustably mounted a weapons system comprising the dual guns 6, a mechanical resolution device or computer 8, a reflex sight system indicated at 10 and a motion-transmitting mechanism indicated at 12 which couples the computer 8 to the reflex sight system. As is customary, a pair of operator stations 14 are provided on the turret to attend to the weapons system.

Referring now particularly to FIGURE 2, the resolution or computer apparatus 8 may be seen to comprise a fixed support 16 rigidly secured on the turret structure 14, and having an annular bearing 18 secured thereon. The computer housing 20, which is generally in the shape of an inverted dome, rigidly supports a flanged annular bearing and retaining member 22 adapted to be seated upon the annular bearing 18 for rotation of the housing throughout 360° about a vertical axis with, of course, the vehicle 2 on horizontal ground. Other bearing support may be provided for the housing as desired and indicated in FIGURE 2. A radial extension of the bearing and retaining member 22 forms a ring gear 24 adapted to be driven to adjustably position the housing 20 in accordance with the direction of the flight path of the target as will be described hereinafter.

The position of the housing 20 on the support 16 is selectively controlled by either power operated or manually operated means, or both. FIGURE 2 illustrates a manually operated means 26 comprising the manually operable handle 28 secured to a shaft 30 mounted in a housing 32 suitably secured to the support 16. A gear 34 at the lower end of the shaft 30 meshes with a gear 36 secured to a shaft 38 rotatably supported within the housing 32, and mounting an additional gear 40 in driving relation with the ring gear 24. Thus, it may be seen that rotation of the handle 28 will rotatably drive the housing 20 to any selected position in accordance with the direction parameter associated with a flying target in a manner to be described. Suitable indicia are employed in conjunction with the drive mechanism 26 for reference purposes in this regard.

A horizontal support and operating rod 42 extends completely across the interior of the housing 20, and is mounted therein by means of a plurality of antifriction bearing assemblies 44 for rotation about its axis. Each end of the support and operating rod 42 extends out of the housing 20, and has rigidly secured thereon a control knob 46 which, cooperating with suitable indicia, are employed to insert the target velocity or speed parameter into the computer mechanism in a manner to be described hereinafter.

A tubular sleeve 48 is rotatably mounted coaxially about one end of the support rod 42 by means of the bearing assemblies 44 aforementioned and bearing assemblies 50, while a circular brake drum 52 having a hub 54 is similarly rotatably mounted coaxially at the other end of the support rod 42 by means of the bearings 44 and 50. The bail 56, in the form of a relatively thin strap, spans the top or dome of the housing 20, and has its opposite ends suitably secured as by clamping to the sleeve 48 and the hub 54 of the brake drum 52. The central portion of the bail 56 is provided with a pointer 58 (see FIGURE 1, also) or other suitable indicating mechanism adapted to cooperate with indica to insert the attitude parameter into the computer assembly. In order to maintain a selected setting of the bail 56, a brake shoe 60 is continuously urged into suitable frictional engagement with the periphery of the drum 52 by means of a leaf spring 62 which may be adjusted by the screw 64 mounted upon a bracket 66 secured to the housing 20.

As previously mentioned, the attitude parameter of the flying target is inserted into the computer mechanism by selective positoning of the bail 56 which rotatably drives the sleeve 48 mounted about rod 42. Referring particularly to FIGURES 2 and 4, it may be seen that a crank arm 68 has one end suitably rigidly secured to the sleeve 48 for rotation with the latter, and has its other end pivotally connected by the pin and anti-friction bearing assembly indicated at 70 to the upper end of a drive link 72 which has its lower end similarly pivotally connected at 74 to a carriage 76. A pinion gear 78 is rigidly supported on one end of a shaft 80 rotatably supported by the bearings 82 on the housing 20. The carriage 76 is freely rotatably mounted about the pinion shaft 80 adjacent pinion gear 78 by means of the bearing 84, and provided with a pair of spaced rollers 86 suitably pivotally mounted on the carriage 76 by the pin and anti-friction bearing assemblies indicated at 88. It will be noted that the rollers 86 project outwardly from the carriage 76 so as to be disposed substantially in the same vertical plane containing the pinion gear 78 and opposite the latter. A rack gear 90 meshes with the pinion 78, and is so positioned between the latter and the rollers 86 as to be supported on the carriage 76 for pivotal movement with the latter about the axis of the pinion shaft 80 in response to actuation of the bail drive illustrated in FIGURE 4 and previously described. Preferably, the bearing assemblies 88 are mounted to the carriage 76 through eccentrics permitting adjustment of the rollers relative to the rack gear.

As previously noted, one or the other of the knobs 46 is adapted to be set in accordance with suitable indicia to rotate the support and operating rod 42 in accordance with the speed or velocity parameter of the flying target. In order to insert this information into the computer assembly, and referring particularly to FIGURES 2 and 4, there is provided a generally L-shaped arm 92 having one leg thereof suitably rigidly clamped to the rod 42, and the other leg thereof extending generally parallel to the axis of the rod 42 for insertion in a suitable socket 94 in the side face of a driving gear 96 rotatably supported coaxially about the sleeve 48 and rod 42 by means of the bearing 98. Driving gear 96 meshes with a one-to-one ratio with the driven gear 100 suitably secured as by keying to the pinion shaft 80. Consequently, rotation of the rod 42 in one direction or the other results in drive being transmitted from gear 96 to gear 100 to rotate the pinion 78. Consequently, the rack gear 90 may be translated on and relative to the carriage 76 irrespective of the adjusted position of the latter about pinion shaft 80.

The translatory motion of the rack gear 90 in response to rotational adjustment of the rod 42 is transferred to a quadrilateral or parallelogram linkage illustrated in FIGURES 2, 3 and 5. This parallelogram linkage comprises four double-armed links 102, 104, 106 and 108, respectively, including suitable reinforcing members indicated at 110. These four links are pivotally interconnected by the pin and bearing assemblies indicated at 112 in FIGURE 3, while the links 102 and 104 are similarly pivotally interconnected about the support rod 42 in order to suspend the entire parallelogram linkage within the housing 20. A resolution or output member in the form of a spherical ball 114 is adapted to be suitably clamped or otherwise rigidly secured to the free end of the output link 108 of the parallelogram linkage. The parallelogram linkage, and hence the output member 114, is adapted to be selectively positioned in accordance with the speed parameter of the target in response to translation of the rack gear 90 relative to the carriage 76 as aforedescribed. Of course, the parallelogram movement also takes the attitude parameter into consideration since the attitude of the rack gear is determined by pivotal adjustment of carriage 76. To this end, and referring particularly to FIGURES 3 and 5, an arm 116 rigidly connects a side surface of the rack gear 90 to a bushing 118 rotatably mounted on the mid-point of the link 106 by means of the pin and anti-friction bearing assembly indicated at 120. Thus, with the carriage 76 disposed in any selected position in accordance with the attitude parameter of the flight path in response to actuation of the bail 56, one or the other of the knobs 46 may be adjusted in accordance with the speed parameter of the target to drive the pinion 78 and translate the rack 90, the output from which acts on the link 106 of the parallelogram linkage to position the latter and the output or resolution member 114.

The operation of the resolution device or computer of this invention will now be described with reference to the diagrammatic illustration of FIGURE 7. FIGURE 7 illustrates a target having a flight path which is horizontal to the ground line and in a vertical plane perpendicular to a vertical plane through the axis of the gun G and the plane of the projectile propelled from the gun. In other words, the direction parameter of the flight path is at right angles to the plane containing the axis of the gun G and hence the path of the projectile propelled therefrom, while the attitude parameter is horizontal. To insert the direction parameter into the computer assembly, and referring to FIGURE 2, the handle 28 is actuated to drive the ring gear 24 secured to the housing 20, thereby rotating the latter to a suitable extent about a vertical axis (asssuming the vehicle is on horizontal ground) until the planes of the linkages illustrated in FIGURES 3 and 4 are parallel to the vertical plane containing the flight path illustrated in FIGURE 7. Thereafter, the bail 56 is manually adjusted to rotate the carriage 76 about the axis of the pinion shaft 80 through the crank arm 68 and link 72 to dispose the rack gear 90 parallel to the attitude of the target; that is, horizontal with reference to the attitude of the target illustrated in FIGURE 7. The rack is so disposed as shown in FIGURES 2 through 5.

Thereafter, the speed of the target along the flight path is determined or estimated, and the knobs 46 rotated accordingly to rotate the support rod 42. Rotation of the rod 42 is transmitted through the arm 92 to the gear means 96 and 100 to rotate the pinion 78 thereby translating the rack 90 relative to the carriage 76. As illustrated in FIGURE 7, the rack gear 90 is translated until the effective length PS thereof between the line of sight to the target and the path of the projectile to be propelled from the gun G is proportionate to the speed of the target. Consequently, the pin and bearing assembly 120 forming the motion-transmitting connection between the rack gear 90 and the link 106 of the parallelogram linkage is translated horizontally causing the output ball 114 to be translated accordingly. Therefore, the output ball member 114 is now positioned in accordance with resolution of the three parameters aforedescribed.

Referring now to FIGURES 8 and 9, it may be seen that the resolution device aforedescribed may be utilized to resolve differing input parameters depending upon the flight path (direction and attitude) of the target and the velocity of the latter. To compute or resolve the appropriate lead angle for a target having a flight path as indicated in FIGURES 8 and 9, the housing 20 is adjusted as previously described to dispose the plane of the linkages shown in FIGURES 3 and 4 parallel to the vertical plane containing the respective flight paths. The bail 56 and the drive mechanism associated therewith as shown in FIGURE 4 is then adjusted to tilt the carriage 76 and hence the rack gear 90 so as to be parallel to the particular flight path illustrated in FIGURES 8 and 9. Thereafter, the speed knobs 46 are adjusted to drive the pinion 78 to translate the rack 90 to an effective length PS to provide the proper lead angle along the flight path.

FIGURE 10 diagrammatically illustrates the parallelogram linkage of FIGURE 3 comprising the four links 102, 104, 106 and 108 pivotally interconnected as indicated at O, B, C and D. The point O corresponds to the axis of suspension of the parallelogram linkage about the support rod 42 as indicated in FIGURE 3, while the point A carried by the link 108 corresponds to the resolution output member 114. The point E intermediate the ends of link 106 corresponds to the input to the parallelogram linkage constituted by the bushing 118 secured to the rack 90 and the connecting assembly 120. Thus, from this figure of the drawings, it may be seen that translation of the point E horizontally to the position E' results in corresponding horizontal translation of the point A to the point A', and corresponding relative pivotal movement of the respective links of the parallelogram linkage. Similarly, vertical translation of the input point E to the point E" results in corresponding vertical translation of the point A to the point A" and similar relative articulation between the various links of the parallelogram linkage. Obviously, depending upon whether the rack 90 is horizontal or vertical, or in some position in between, the input point E and resolution output point A may be translated in various other directions in addition to horizontal and vertical as aforedescribed.

As will now be obvious, the aforedescribed mechanical resolution device or computer functions in accordance with certain geometrical relationships illustrated in FIGURES 7 through 10. Thus, the computer assembly functions to align the rack 90 parallel to the flight path (direction and attitude parameters) of the target, and the rack is displaced by the drive pinion 78 along the target path in accordance with the velocity of the target. Referring to FIGURES 7 through 9, this speed displacement of the rack is such that when the line of sight to the target passes through points G and S and the target, the axis GP of the Gun G is directed to the correct position or at the proper lead angle to intercept the flight path of the target. The distance GP is a fixed length on the gun which, in this instance, is equal to 5.840 inches. The length PS of the rack is a variable which is dependent upon the velocity of the projectile fired from the gun and the velocity of the flying target. For the design of the computer of this invention, an average projectile velocity of 819 yards per second has been selected. The length PS is then a variable directly proportional to the flight velocity. Thus, with the velocity of the projectile fixed, the displacement PS is a function of target velocity so that the speed knobs 46 may be calibrated with a corresponding speed scale. Thus, inasmuch as the rack displacement PS is proportional to the velocity of the target, for any flight shown in FIGURES 7, 8 or 9 or some other path, it is only necessary to align the rack 90 parallel to the flight path (direction and attitude parameters) and then displace the rack a suitable distance PS in accordance with the velocity of the target.

Referring to FIGURE 10, the parallelogram linkage can be rotated through 360° since it is suspended on the axis 0 of shaft 42 supported on the housing 20 which may be so rotated. The input point E can move to any position in the plane of the linkage within the physical design limitations of the latter. In the particular linkage illustrated, the maximum displacement PS of the rack gear and output A is 2.440 inches and, because input point E is located at the mid-point of link 106, the point E will have to be moved only one-half this distance. Thus, the ratio of displacement of points A and E is always 2:1 in any direction.

Reference will now be made to FIGURES 1, 2 and 6 with respect to a description of the motion-transmitting or coupling mechanism 12 for transmitting the resolved signal from the output member 114 of the computer to the reflex sight system 10. To this end, the ball member 114 providing the resolution output signal is seated within a suitable spherical socket in the generally L-shaped adapter 122 which, in turn, has its opposite end operatively secured to a resolution slide 124. The slide 124 includes one or more longitudinal splines 126 which guide the slide for reciprocating movement within a housing 128 secured to one end of a tubular shaft 130 which is rotatably supported by the bearings 132 within the tubular housing 134 secured to and extending transversely of the turret between the computer 8 and reflex sight system 10. More specifically, the free end of the slide 124 is slidably disposed in a mating opening 127 at the lower end of a rotatably mounted vertical shaft 140 to which the pulley wheel 142 is secured. A reflex sight support indicated at 144 in FIGURE 1 is secured to a pulley wheel 146 rotatably supported about the vertical shaft 148 mounted in housing 150 carried at the other end of tubular shaft 130 as indicated in FIGURE 6. A motion-transmitting belt 152 is entrained about the pulley wheels 142 and 146 at opposite ends of the rotatable shaft 130, and is also entrained between suitable idler wheels 154 and an additional idler mechanism indicated generally at 156 and mounted on the tube 130 for rotation with the latter within a housing portion 158 of the support tube 134.

In operation of the coupling mechanism 12, it will be readily apparent from FIGURE 2 that any vertical component of motion of the resolution output member 114 will act upon the resolution slide 124, which is confined by the splines 126 in opening 127 for solely translational movement relative to the shaft 140, with the result that such a vertical component of motion will cause the entire tubular member 130 including the pulley construction to rotate about its longitudinal axis within the support tube 134. Conversely, the horizontal component of motion of the resolution output member 114 into and out of the plane of FIGURE 2 will swing the slide in an arcuate path about the axis of shaft 140, thus pivoting the latter and driving the pulley 142 to position the sight mount pulley 146 and hence the sight. In this manner, the single output signal from the computer 8 is coupled and transmitted to the support for the reflex sight 10 in interposing the proper lead angle between the line of sight to the target and the line of fire of the gun.

The computer structure aforedescribed provides several advantages which have been unobtainable heretofore in prior art devices of this type. Among the more important of these advantages is the fact that the 1:2 displacement ratio between the input E to the parallelogram link 106 and the resolution output device A of FIGURE 10 minimizes linkage movement and wear. Moreover, the major control components such as the linkages shown in FIGURES 3 and 4 are suspended from the single support rod 42. The use of the single support shaft or rod 42 for suspending the major components of the assembly provides improved rigidity and stabilization of the system and reduces resolution errors, as well as permitting manufacturing and assembly economies such as in-line machine of the pivotally mounted links and a minimum of adjustment at final assembly. Moreover, the centers of gravity of the respective linkages shown in FIGURES 3 and 4 are on opposite sides of the support rod 42 and act in opposition to each other through the rack gear connection. Thus, the system is essentially counterbalanced, thereby minimizing input power required to operate it and reducing dynamic effects on the assembly due to firing of the gun.

While but one form of the invention has been shown and described, other forms will be apparent to those skilled in the art. Therefore, the embodiment shown in the drawing is merely for illustrative purposes, and is not intended to limit the scope of the invention which is defined by the claims which follow.

I claim:

1. A mechanical resolution device for resolving a plurality of input parameters into a single output signal comprising a support, a carriage pivotally mounted on said support, a rack gear, means supporting said rack gear on said carriage for pivotal movement with the latter and translation relative to said carriage in any selected position of the latter, means operatively connected to the carriage for pivoting said carriage to dispose said rack gear in a selected position on said support in accordance with a first parameter, means operatively connected to the rack gear for translating said rack gear to a selected position on said carriage in accordance with a second parameter, a resolution output member movably mounted on said support, and means connecting said rack gear in motion-transmitting relationship to said output member.

2. A mechanical resolution device for resolving a plurality of input parameters into a single output signal comprising a support, a carriage pivotally mounted on said support, a rack gear, means supporting said rack gear on said carriage for pivotal movement with the latter and translation relative to said carriage in any selected position of the latter, means operatively connected to the carriage for pivoting said carriage to dispose said rack gear in a selected position on said support in accordance with a first parameter, means operatively connected to the rack gear for translating said rack gear to a selected position on said carriage in accordance with a second parameter, a parallelogram linkage pivotally mounted on said support and including four pivotally interconnected links, a resolution output member carried by one of said links, and means connecting said rack gear in motion-transmitting relationship to said linkage.

3. A mechanical resolution device for resolving a plurality of input parameters into a single output signal comprising a support, a carriage pivotally mounted on said support, a rack gear, means supporting said rack gear on said carriage for pivotal movement with the latter and translation relative to said carriage in any selected position of the latter, means operatively connected to the carriage for pivoting said carriage to dispose said rack gear in a selected position on said support in accordance with a first parameter, means operatively connected to the rack gear for translating said rack gear to a selected position on said carriage in accordance with a second parameter, a parallelogram linkage including four pivotally interconnected links, said linkage being pivotally mounted on said support on the axis of pivotal interconnection of a pair of said links, a resolution output member carried by one of said links, and means connecting said rack gear in motion-transmitting relationship to another of said links.

4. A mechanical resolution device for resolving a plurality of input parameters into a single output signal comprising a support, a gear secured to a shaft rotatably mounted on said support, a carriage pivotally mounted about said shaft adjacent said gear, a pair of spaced support rollers pivotally mounted on said carriage substantially in the plane of and opposite said gear, a rack gear meshing with said gear and being supported between said gear and said rollers for pivotal movement with said carriage, means operatively connected to the carriage for pivoting said carriage to dispose said rack gear in a selected position in accordance with a first parameter, means operatively connected to the rack gear for rotating said gear to translate said rack gear relative to said carriage to a selected position in accordance with a second parameter, a resolution output member movably mounted on said support, and means connecting said rack gear in motion-transmitting relationship to said output member.

5. A mechanical resolution device for resolving a plurality of input parameters into a single output signal comprising a support, a gear secured to a shaft rotatably mounted on said support, a carriage pivotally mounted about said shaft adjacent said gear, a pair of spaced support rollers pivotally mounted on said carriage substantially in the plane of and opposite said gear, a rack gear meshing with said gear and being supported between said gear and said rollers for pivotal movement with said carriage, means operatively connected to the carriage for pivoting said carriage to dispose said rack gear in a selected position in accordance with a first parameter, means operatively connected to the rack gear for rotating said gear to translate said rack gear relative to said carriage to a selected position in accordance with a second parameter, a parallelogram linkage pivotally mounted on said support and including four pivotally interconnected links, a resolution output member carried by one of said links, and means connecting said rack gear in motion-transmitting relationship to said linkage.

6. A mechanical resolution device for resolving a plurality of input parameters into a single output signal comprising a support, a gear secured to a shaft rotatably mounted on said support, a carriage pivotally mounted about said shaft adjacent said gear, a pair of spaced support rollers pivotally mounted on said carriage substantially in the plane of and opposite said gear, a rack gear meshing with said gear and being supported between said gear and said rollers for pivotal movement with said carriage, means operatively connected to the carriage for pivoting said carriage to dispose said rack gear in a selected position in accordance with a first parameters, means operatively connected to the rack gear for rotating said gear to translate said rack gear relative to said carriage to a selected position in accordance with a second parameter, a parallelogram linkage including four pivotally interconnected links, said linkage being pivotally mounted on said support on the axis of pivotal interconnection of a pair of said links, a resolution output member carried by one of said links, and means connecting said rack gear in motion-transmitting relationship to another of said links.

7. A mechanical resolution device for resolving a plurality of input parameters into a single output signal comprising a housing, a support rod extending through and mounted within said housing, a pinion gear secured to a shaft rotatably supported within said housing, a carriage pivotally mounted about said shaft adjacent said pinion gear, a pair of spaced support rollers pivotally mounted on said carriage substantially in the plane of and opposite said pinion gear, a rack gear supported between said pinion gear and rollers for pivotal movement with said carriage and including gear teeth meshing with said pinion gear, carriage drive means pivotally supported on said support rod and connected to said carriage to pivot said rack gear to a selected attitude within said housing in accordance with a first parameter, means including a driving gear rotatably supported on said support rod and operatively connected to said pinion gear for rotatably driving the latter to translate said rack gear relative to said carriage to a selected position in accordance with a second parameter, a parallelogram linkage including four pivotally interconnected links, a pair of said links being pivotally interconnected about said support rod to mount said linkage within said housing, a resolution output member carried by one of said links, and means connecting said rack gear in motion-transmitting relationship to another of said links.

8. A mechanical resolution device for resolving a plurality of input parameters into a single output signal comprising a housing, a pinion gear shaft rotatably supported within said housing, a pinion gear secured to said shaft for rotation with the latter, a carriage pivotally mounted about said shaft, a pair of spaced support rollers pivotally mounted on said carriage substantially in the plane of and opposite said pinion gear, a rack gear meshing with said pinion gear and supported between the latter and said rollers for pivotal adjustment with said carriage, a support rod rotatably mounted about its axis within said housing, a tubular sleeve coaxial with and rotatably mounted around said rod, a crank arm secured to said sleeve, a link having its opposite ends pivotally connected respectively to said crank arm and carriage, means for rotating said sleeve to pivot said carriage and dispose said rack gear in a selected attitude in accordance with a first parameter; a driving gear rotatably supported coaxial with and about said sleeve, a driven gear meshing with said driving gear and secured to said pinion gear shaft to rotate said pinion in response to rotation of said driving gear, means operatively connected to the driving gear for rotating said driving gear to translate said rack relative to said carriage to a selected position in accordance with a second parameter; a parallelogram linkage including four pivotally interconnected links, a pair of said links being pivotally interconnected about said support rod to support said linkage within said housing, a resolution output member carried by one of said links, and means connecting said rack gear in motion-transmitting relationship to another of said links.

9. A mechanical resolution device for resolving a plurality of input parameters into a single output signal comprising a support, a housing rotatably mounted on said support, means operatively connected to the housing for rotating said housing to a selected position on said support in accordance with a first parameter, a carriage pivotally mounted within said housing, a rack gear, means supporting said rack gear on said carriage for pivotal movement with the latter and translation relative to said carriage in any selected position of the latter, means for pivoting said carriage to dispose said rack gear in a selected position on said housing in accordance with a second parameter, means operatively connected to the rack gear for translating said rack gear to a selected position on said carriage in accordance with a third parameter, a parallelogram linkage including four pivotally interconnected links, said linkage being pivotally supported within said housing on the axis of pivotal interconnection of a pair of said links, a resolution output member carried by one of said links, and means connecting said rack gear in motion-transmitting relationship to another of said links.

10. A mechanical resolution device for resolving a plurality of input parameters into a single output signal comprising a support, a housing rotatably mounted on said support, means operatively connected to the housing for rotating said housing to a selected position on said support in accordance with a first parameter, a gear secured to a shaft rotatably supported within said housing, a carriage pivotally mounted about said shaft adjacent said gear, a pair of spaced support rollers pivotally mounted on said carriage substantially in the plane of and opposite said gear, a rack gear meshing with said gear and being supported between said gear and said rollers for pivotal movement with said carriage, means operatively connected to the carriage for pivoting said carriage to dispose said rack gear in a selected attitude within said housing in accordance with a second parameter, means for rotating said gear to translate said rack gear relative to said carriage to a selected position in accordance with a third parameter, a parallelogram linkage including four pivotally interconnected links, said linkage being pivotally suspended within said housing on the axis of pivotal interconnection of a pair of said links, a resolution output member carried by one of said links, and means connecting said rack gear in motion-transmitting relationship to another of said links.

References Cited by the Examiner

Product Engineering, October 1949, 74–471 (XY) "Mechanical Computing Mechanism—III," pp. 126–130).

BROUGHTON G. DURHAM, *Primary Examiner.*

DON A. WAITE, *Examiner.*

P. W. SULLIVAN, *Assistant Examiner.*